United States Patent [19]

Etcheverry et al.

[11] 4,015,262
[45] Mar. 29, 1977

[54] DIGITAL FILTERS FOR OBTAINING QUADRATURE COMPONENTS OF A PERIODIC SIGNAL

[75] Inventors: Fred Etcheverry, San Pedro; Harold Ray Samuelson, Los Angeles, both of Calif.

[73] Assignee: Northrop Corporation, Los Angeles, Calif.

[22] Filed: Dec. 30, 1974

[21] Appl. No.: 537,245

[52] U.S. Cl. .................. 343/105 R; 235/150.272; 324/83 D
[51] Int. Cl.² .......................................... G01S 1/30
[58] Field of Search ......... 343/105 R; 235/150.272; 324/83 D

[56] References Cited

UNITED STATES PATENTS 3,689,925  9/1972  Hulland ..................... 343/105 R Primary Examiner—Maynard R. Wilbur
Assistant Examiner—Richard E. Berger
Attorney, Agent, or Firm—Edward A. Sokolski

[57] ABSTRACT

A digital filter for obtaining quadrature components in a periodic signal, such as the recovery of phase and/or amplitude of two or more periodic signals through coherent digital summation techniques. In one embodiment of the invention, the digital filter forms part of an omega type radio navigation system in which a mobile receiver station receives a signal containing three preselected frequencies of interest transmitted from a plurality of fixed transmitting stations in timed sharing sequence. The mobile receiving station may contain band pass filters to receive the signal and separate and pass only the three preselected frequencies of interest. These three preselected frequencies of interest are then summed and introduced into a sample and hold circuit which operates in combination with an analog-to-digital converter. In this way, the digital equivalent of each of these three preselected frequencies are generated on a pre-established sample time basis so that digital binary numbers represent the voltages of the frequency samples. A data processor receives the binary number equivalents of these frequencies and generates a phase relationship between the preselected frequencies. In this way, when the digital filter forms part of the omega type navigation system, it is possible to thereby determine the location of the mobile receiving station relative to the fixed transmitting stations.

13 Claims, 4 Drawing Figures

DIGITAL FILTERS FOR OBTAINING QUADRATURE COMPONENTS OF A PERIODIC SIGNAL

BACKGROUND OF THE INVENTION

This invention relates in general to improvements in apparatus and method for measuring the amplitude and phase of sine waves of known frequency. In particular, the invention relates to the measurement of several sine waves which have a coherent frequency relationship and which arrive at a receiver accompanied by noise and/or coherent interference. The first embodiment of this invention is used in conjunction with a receiver for an Omega navigation system.

In the conventional Omega navigation system, three primary navigation frequencies, 10.2 kHz, 11⅓ kHz, and 13.6 kHz, are transmitted from eight stations and provide navigation signals blanketing the Earth. A receiver, particularly aboard an aircraft, receives these signals accompanied by noise and interference from atmospheric sources, man-made sources and the interactions between the aircraft itself and the atmosphere through which it flies.

These receivers frequently include a small digital computer used for a variety of tasks. This computer is capable of applying a number of sophisticated processing algorithms to a digital representation of the combined signals and noise to extract the signals from the noise and interference. However, such algorithms can only be effective if a faithful reproduction of the composite signal and noise which appears at the receiver antenna, in the form of an electromagnetic field, is provided to the computer algorithm in digital form.

The present invention obviates these and other problems in the provision of a digital filter utilizing coherent digital summation techniques for the recovery of quadrature components, such as phase and/or amplitude of two or more periodic signals. This digital type filter, which can be used in a wide variety of applications, finds effective employment in a receiver used in an omega radio navigation system. This receiver utilizes the sampling digital filter for processing a transmitted signal comprised of a plurality of pre-established frequencies of interest. In this digital filter, a plurality of band pass filters pass only the frequencies of interest of which are thereafter combined. A sampling and conversion circuit receives the combined signal and generates a digital equivalent thereof at a preselected sample rate. In addition, a digital type processor is operatively connected to the sampling and conversion circuit to determine the phase relationship of the frequencies of interest in the combined signal.

It is therefore the primary object of the present invention to provide a digital filter which is capable of recovering quadrature components, as for example, phase and/or amplitude, of a plurality of periodic signals through digital summation techniques.

It is also an object of the present invention to provide a receiver for omega type radio navigation systems which utilizes digital measuring techniques for the monitoring and comparison of received signals.

It is a further object of the present invention to provide a sampling digital type filter of the type stated and which digital type filter processes a transmitted signal having a plurality of frequencies of interest and at least one subharmonic frequency which is common to the frequencies of interest.

It is an additional object of the present invention to provide a method of determining the location of a mobile receiving station with respect to at least two fixed transmitting stations by converting frequencies of interest in the transmitted signals and processing the digital equivalents of these frequencies of interest.

It is another salient object of the present invention to provide a sampling digital filter of the type stated which is relatively simple in its construction and therefore lends itself to low manufacturing costs and low operational costs.

With the above and other objects in view, our invention resides in the novel features of form, construction, arrangement, and combination of parts presently described and pointed out in the claims.

GENERAL DESCRIPTION

In general, traditional methods of detecting signals of the aforementioned sinusoidal type have been to perform a correlation type of operation. In such an operation the incoming information, in analog form, is multiplied by a reference sine wave of the appropriate frequency. It is known that the product of two sine waves consists of the sum of two sine waves, one having as its frequency the sum of the two frequencies and the other having as its frequency the difference of the two original frequencies. More specifically, the sum and difference of the phases of the two signals is retained in the product.

A common practice has been to generate, in a receiver, two reference sine waves, one 90° out of phase with the other, but both presumably at the same frequency as the incoming signal sine wave. The incoming signal is multiplied in multiplier circuits by both the reference frequencies in separate analog circuits or channels. The difference frequency present in each of the multiplier circuits constitutes direct current or a constant voltage proportional to the product of the amplitudes of reference signals and incoming signal. Also, the product in one channel responds to the sine and the other to the cosine of the phase difference between incoming information and the reference signals. The products are integrated over a period of many cycles. In its optimal form, it is integrated over an integer number of cycles so that the sum frequency information integrates to zero. Considerable noise filtering takes place as the result of the integration. Also, the output of the integrators develops two dc voltages, one proportional to the sine of the phase difference between the reference and incoming signal and the other proportional to the cosine of such phase difference. This form is convenient for conversion to digital format where phase can be computed explicitly. Traditional methods of transducing the signal from an electromagnetic field form into electrical analog form and then from that to digital form have been limited in the dynamic range over which a faithful model of the original input could be retained thus limiting the effectiveness with which computer processing algorithms could be applied.

The limiting component within the traditional receiving system design has been the second detector. In this type of receiver it is the function of the second detector to transduce the signal from an electrical analog sine wave or rather band of frequencies into a digital representation which changes at a sufficiently slow rate to permit processing at reasonable computer speeds. This detector is that component of the system which has tended to limit dynamic range and it is the goal and the achievement of this invention to extend the dynamic range to achieve that which is necessary to permit the application of the aforementioned sophisticated processing techniques.

When this process is carried out in the form just described, it is conventionally called base banding. The steps involved are performed in analog circuitry and include: (1) generate the frequency of interest frequently by countdown from a stable oscillator, (2) generate sine waves in phase and in quadrature, (3) perform an analog multiplication in two separate units of circuitry, and (4) perform two analog integrations.

Implementation of the preceding steps results in a significant amount of circuitry, each component of which contributes its errors to the process and places limitations on the fidelity of reproduction, as well as contributing its element of cost to the system, since if more than one frequency is to be received all of the aforementioned circuitry has to be replicated, once for each frequency.

A general description of the invention, herein disclosed, would be to consider the invention as having first replaced the continuous analog integration by a summation of discrete samples taken at a finite rate. This is followed by a reversal of order in that the summing takes place first in a distributed fashion so that the multiplication by sines and cosines can take place later in the system after the information has been transformed into digital form. In this way, a considerable portion of the operation has been put into digital form where it can be performed by digital circuits that are time shared between the various frequencies of interest and within which an arbitrarily high degree of fidelity can be preserved by simply extending the word length of the digital operations. In fact, the combined signals containing the two, three, or however many frequencies of interest and the associated noise that appears in the spectrum near each such frequency appear as one combined analog signal and are sampled at a rate that is harmonically related to each of the frequencies of interest. These samples are then accumulated after having been converted to digital form. The digital summations are then operated on as mathematical quantities to yield the base banded, phasor representations of each of the incoming signals of interest.

The functioning of the invention can best be illustrated by describing its application to an Omega receiver. The three Omega signals of primary interest are on the frequencies, 10.2 kHz, 11⅓ kHz and 13.6 kHz. The highest common subharmonic of these frequencies is 1133⅓ hertz. 10.2 kHz is 9 times this base frequency, 11⅓ is 10 times this base frequency and 13.6 kHz is 12 times this common base frequency. In the Omega receiver, the composite incoming information is sampled at a rate of 14 times the base frequency or at 15,866⅔ hertz. Each sample is converted to digital form and is added to one of fourteen digital summors. Successive samples are converted and added to successive summors in order, and this process iterates until each summor has had one number added to it. That is, fourteen samples have been taken. This process, in turn, can be iterated idefinitely. Typically, the iteration process starts at the beginning of an Omega transmission and is terminated near the end of an Omega transmission, about one second, and after an integer number of sets of 14 samples has been summed. At this point a high degree of filtering has taken place since each successive group of 14 samples coherently reinforces the signal frequency content from the previous group whereas random noise will not add coherently.

After the full accumulation of data has taken place, the digital processor can then multiply each of the fourteen summors by an appropriate sine or cosine of an angle and produce a sum of these products. By appropriate mathematical combination of these sums, the processor obtains six numbers representing the quadrature and inphase form of the three original signals. The desired navigation information is the phase of the three Omega signals. This phase is obtained by computing the arctangent of ratio of the inphase and quadrature numbers for each of the three Omega frequencies.

Of great importance is the fact that a highly faithful representation of the original input has been preserved. It is a reasonable establishment that faithful reproduction was enhanced by elimination of errors and distortions associated with conventional analog circuitry. This removal of the errors and distortions has taken place by virtue of eliminating the analog circuitry itself. For the conventional correlator type of receiver to receive three signal frequencies, such receiver requires six analog multiplies, six analog integrators, a complex countdown chain to provide three frequencies and two phases and some degree of sophistication in switching, or replicated analog to digital conversion circuitry, to finally produce the digital numbers. In contrast, and in accordance with the present invention, one means for sampling the composite signal, one means for converting the samples to digital form, and one means for producing the one and only sampling frequency are required. Since the functions of multiplication by sine waves have been removed from the analog hardware, the errors introduced in performing these functions no longer exist. Further, because the processes of multiplying by sines and cosines and summing cause any dc component in the original or converted signal to sum to zero, any bias errors in the circuitry are self-cancelling and self-calibrating. Further, any scale factor error in either the sampling or the analog-to-digital conversion circuits is cancelled out when the inphase-quadrature representation of each sine wave is converted to an amplitude-phase representation. This cancellation occurs because the phase information which is of primary concern involves the use of the ratio of the inphase and quadrature numbers and each of these would have the same scale factor error since each came from the same sampler and digital converter.

In the following section of this disclosure, a detailed description of the invention in the form of drawings, descriptive equations, and descriptive text is provided. It is nevertheless deemed appropriate to indicate some peripheral aspects of the invention and auxiliary components of the system which mate with the invention itself, particularly for high precision, high performance Omega receiver applications. It is recognized the invention significantly increases the dynamic range of the second detector. Nonetheless, the achievable dynamic range still remains finite and the signals of interest can be suppressed in the presence of large amplitude out-of-band radio frequencies, or two of the Omega frequencies can be suppressed by the presence of a large amplitude third Omega frequency. Therefore, it is necessary that some means be provided to limit or compress the total incoming signal. This function, while necessary, is not extremely critical as to the way in which it is performed.

In the first embodiment of the present invention, it, therefore, has been deemed appropriate to provide three soft-limiting circuits which limit the range of linear performance to slightly larger than that necessary to represent the dynamic range of interest. Preceding each of the limiting circuits is a bandpass filter with a bandwidth of 200 Hz, centered about each Omega frequency. The purpose of these bandpass filters is to sharply attenuate out-of-band interference, noise, other Omega frequencies and extraneous signals which are the upper harmonics of the base frequency. Following each of the limitors is a very uncritical bandpass filter designed to remove harmonic content which is generated when any limiting takes place. The outputs of the three secondary bandpass filters are then summed together still in analog form prior to entering the sampling means.

Bandpass filters of the type described typically introduce phase shifts into the signals as they pass through these filters. For high precision applications, it is either necessary or desirable that these phase shifts be calibrated out. This is performed by introducing an impulse of known width, at the common subharmonic base frequency, at the antenna junction prior to separation of the composite signals into the three channels. These impulses coming in at the common subharmonic frequency contain within them harmonics coherently phased and on the three Omega signal frequencies and of sufficient amplitude to be measured and used to calibrate the phase shift in the three sets of bandpass filters. These calibration signals are turned on for short periods of time during which the Omega signals are not on the air.

It is to be recognized that there is a class of signal environments in which these peripheral functions would be unnecessary, except perhaps for a broad filter to remove the image frequencies. This could be one filter broad enough to cover the entire Omega band of frequencies which extends from approximately 10 to 14 kHz. In this class of environment, three bandpass limiters would be unnecessary and only one broad and very uncritical filter would be required to remove the images. In such a class, the calibration function would also be unnecessary. The principal advantages of this invention to a receiver of this class would be, first, its low cost and the fact that it retains the high fidelity of reproduction; secondly, it does not require the dynamic range compensation that is required by more traditional conversion means; and, thirdly, it does not impose the up to 6 db loss in signal to noise ratio that is imposed by the more traditional means of receiver design.

BRIEF DESCRIPTION OF THE DRAWINGS

Figure 1:
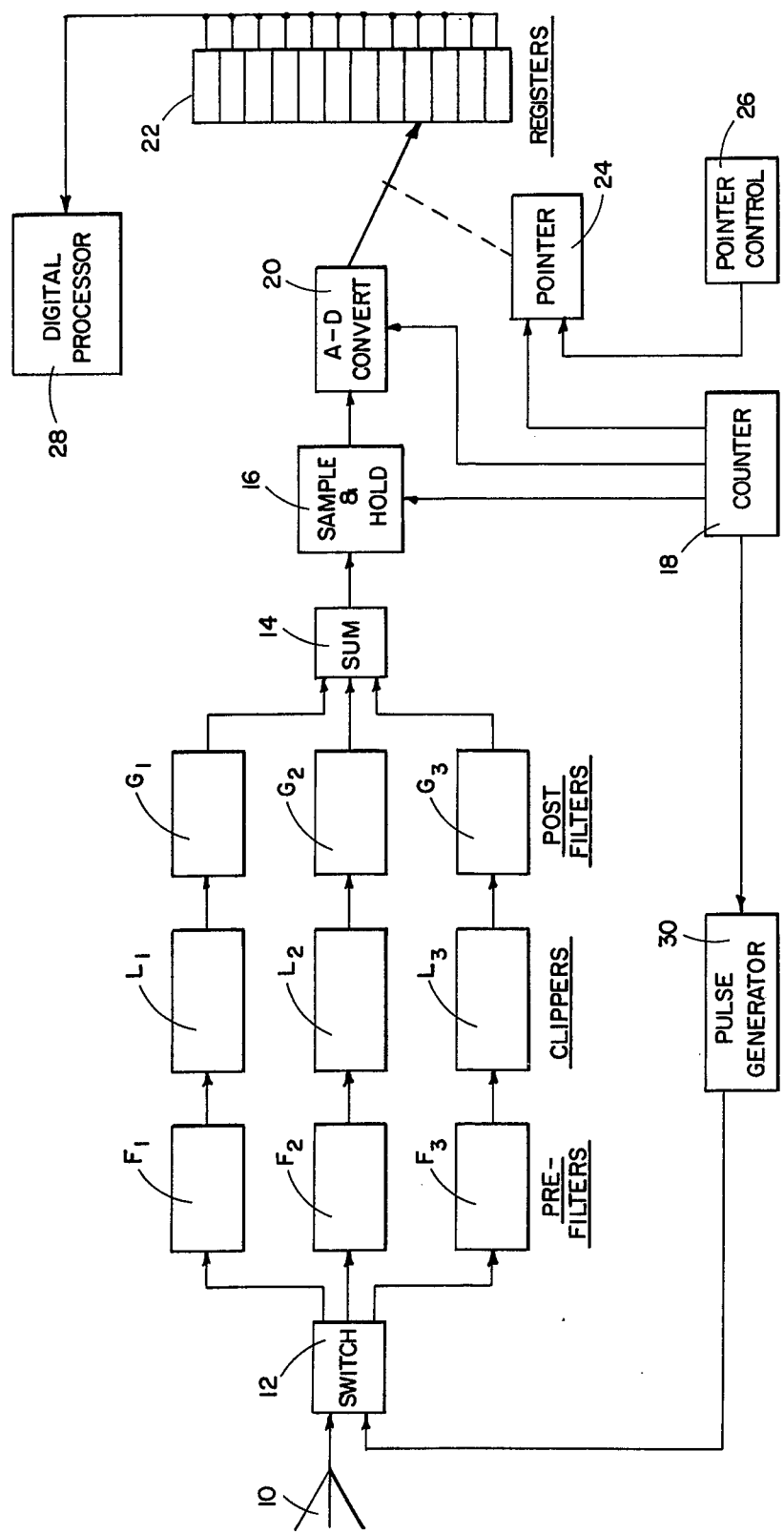
Figure 2:
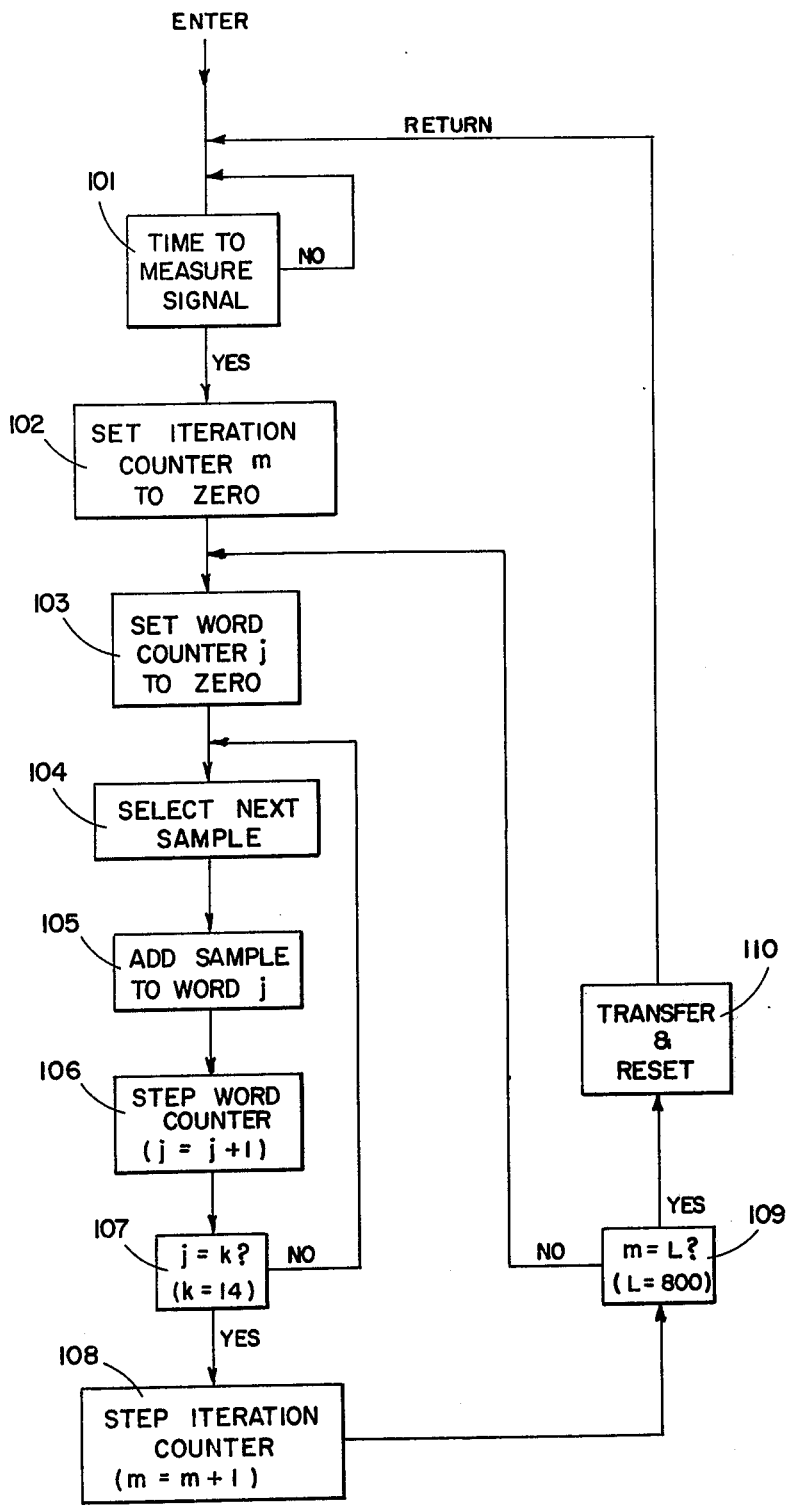
Figure 3:
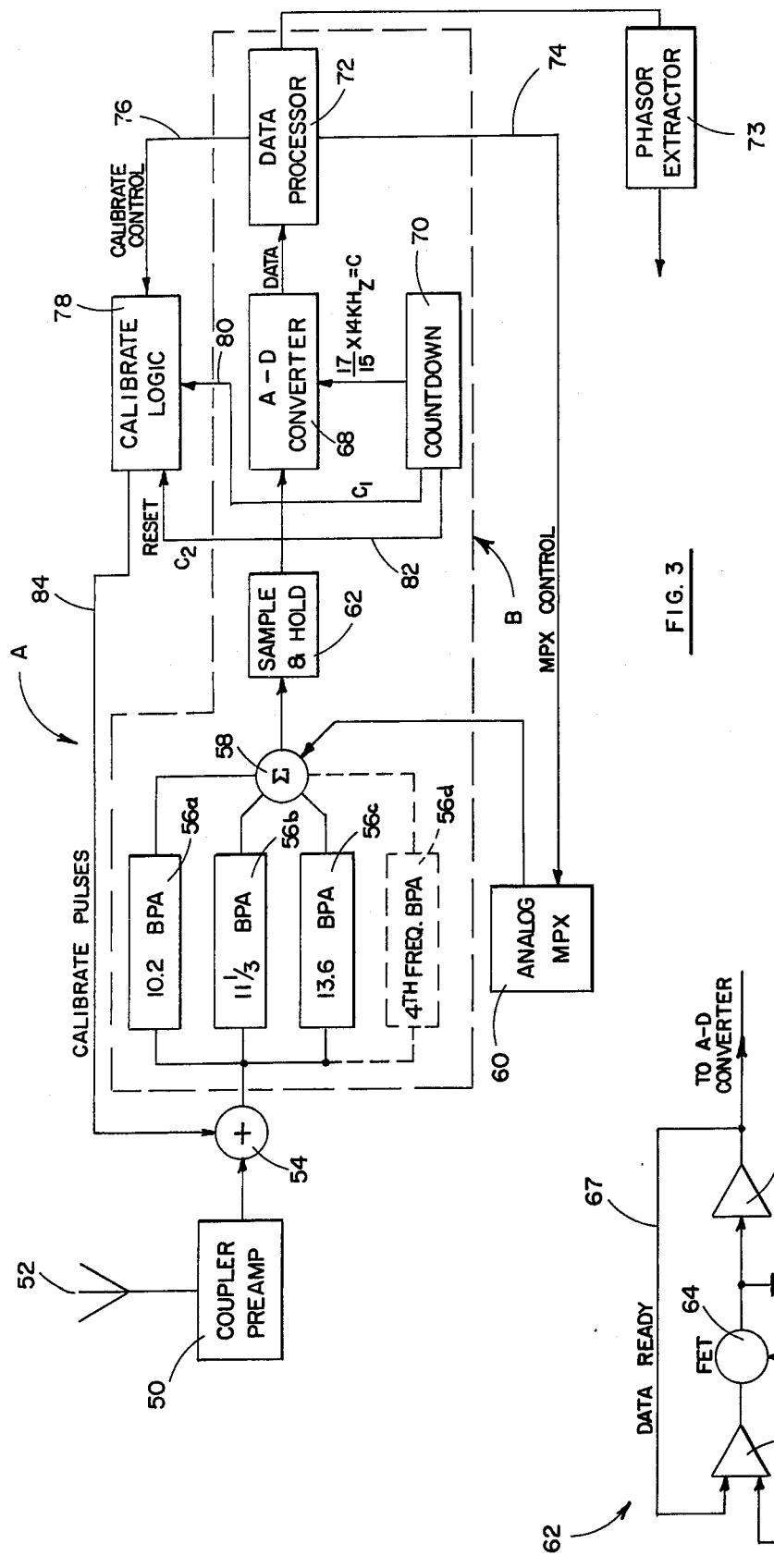
Figure 4:
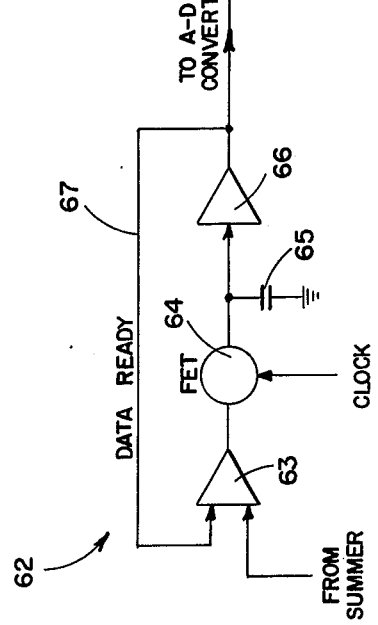

Having thus described the invention in general terms, reference will now be made to the accompanying drawings in which:

FIG. 1 is a schematic view of the electrical circuit which forms the digital filter of the present invention;

FIG. 2 is a diagrammatic view showing the various functions accomplished by the filter of the present invention;

FIG. 3 is a schematic view of a portion of a modified form of electrical circuit which forms part of the radio navigation receiver of the present invention; and FIG. 4 is a schematic view of the sample and hold circuit forming part of the receiver of FIG. 3

DETAILED DESCRIPTION

A practical embodiment of this invention is illustrated in FIG. 1, in which a filter B is used so that three or more frequencies of interest are measured. In order to more fully describe the filter B of the present invention, this filter is described in conjunction with its use in measuring the amplitude or phase of sine waves of known frequency, as in a receiver. This receiver comprises an antenna 10 connected to an antenna switch 12 followed by a plurality of channels (3 as shown). Each channel consists initially of a bandpass filter $F_1$, $F_2$, $F_3$, followed by clippers $L_1$, $L_2$ and $L_3$, which are in turn followed by bandpass filters $G_1$, $G_2$ and $G_3$. These channels are all analog circuits, and the principal purposes of each of these channels are two fold: (1) to raise the level of the signals coming from the antenna switches 12 to the required by subsequent analog-to-digital converters and (2) to provide limiting selectively by channel, where such is necessary.

The bandpass filters $F_1$, $F_2$ and $F_3$ need only be sufficiently narrow to assure that no more than one frequency of interest will appear in appreciable amplitude in any limiter, thus preventing signals of interest from intermodulating each other. The limiters $L_1$, $L_2$ and $L_3$ have a characteristic which is linear over the full range of the analog-to-digital converter, or at least a major portion thereof, and then clip the signal (if it exceeds this range) to the level which, when summed, will refrain from saturating the analog-to-digital converter. The post filters $G_1$, $G_2$ and $G_3$ have as their function elimination of harmonics generated in the limiters $L_1$, $L_2$ and $L_3$. The outputs of the post filters $G_1$, $G_2$ and $G_3$ are introduced into a summing junction 14 which is simply an analog summing junction.

The output of the summing junction 14 is introduced into a sample and hold circuit 16 which has as its function, the taking of an instantaneous sample of the composite signal out of summing junction 14 at the time designated by a counter 18. This hold circuit 16 then holds the voltage representative of the composite signal while it is converted to digital form in an analog-to-digital converter 20 of the type mentioned above. The digital form of the voltage is then added to one of the registers R in a register block 22. There are $k$ registers in the register block. The particular register to which the digital form of the composite voltage is added is designated by a pointer 24 which is operable from a remote pointer or select control circuit 26. Upon completion of one sampling operation, the pointer 24 steps (upon receiving a pulse from a counter 18) so that it points to the next register. After pointing to the kth register, it then resets and points to the first register and continues on until the process terminates after many cycles through all $k$ registers.

The processing beyond this is digital in nature and, in general, can be expected to be performed in a digital computer and, in the case of the present invention, a digital processor 28. This processor 28 receives an output from the register block 22. The heart of the invention is in the particular combination in which the counter 18, the pointer 24, the sample and hold circuit 16, the analog-to-digital converter 20, and register block 22 interact, permitting any of a variety of digital processes to operate on the data. It is, of course, possible that the register block 22 will be physically contained within a digital computer's memory if the computer's own nature so permits.

A pulse generator 30 receives an input from the counter 18 and provides an output to the antenna switches 12. It is frequently necessary that the phase shift through the amplifier filters of the receiver and the phase shift in the antenna switching circuits themselves must be known for certain types of measurements. The pulse generator is used to construct a pulse of known width and injects this pulse at the antenna switch circuits. This pulse contains in its spectrum, consine waves which are harmonics of the pulse frequency. Normally, the generation of these pulses is controlled by the processor 28. However, the counter 18 can also trigger the generation of the pulse each time it recycles through the kth register. This causes the pulse repetition rate to be simply the base frequency or common subharmonic of all frequencies present. The filter circuits $F_1$, $F_2$ and $F_3$ eliminate those frequency components which are not among the frequencies of interest and so the remaining signals that arrive at the summing junction 14 are the frequencies from the pulse spectrum which are of interest. The normal measuring process takes place on these pulses and their phase can be measured in the conventional manner. It is then possible to subtract this phase from that measured on incoming signals, in which case the phase of the received signal is that compared as of the point where the pulses are introduced into a receiver, or into the antenna 10.

As indicated in accordance with the invention, there is one function of sampling and holding the analog value at a specific point in time, and a second function of converting these held voltages to digital form. The need for this method of operation arises when the time taken by analog-to-digital conversion is appreciable relative to the frequencies being sampled. There are, however, cases in which the conversion time is sufficiently short relative to the frequencies in question that a tracking form of analog-to-digital converter might be employed. Such an analog-to-digital converter provides a continuous digital output representing the instantaneous value of analog input.

One mechanization of such a device operates by utilizing a digital register to control and an analog output which is continuously compared with the instantaneous values of analog input. In this case, the digital register is counted up or down to cause its resulting analog output to continuously track the impinging voltage. When the converter can change state fast enough to track with sufficiently small instantaneous error to be within the required resolution of the system, these functions can be combined. When such a converter is used, the digital register associated with the analog-to-digital converter would be changing it at fairly high rate and the sampling pulses from the counter 18 would simply cause the transfer of the digital data as of that instant into the appropriate register in the register bank 22.

In order to more fully describe the preferred embodiment of the circuit of the present invention, it may be assumed that the input composite signal to the circuit of FIG. 1 (which may be deemed a "fast sampler") is comprised of a sum of signals on different frequencies. These frequencies include a small finite set of frequencies from which information is to be extracted, and a continuum of frequencies containing unwanted signals such as noise, from which the frequency data of interest is to be extracted. Since the operation of the circuit is primarily linear in nature, it will suffice at least at the beginning to examine the behavior of the device in treating any one frequency and in recognizing that the output of the circuit will be the algebraic sum of the responses to each of the individual frequencies present, both those containing information of interest, and those containing the information to be discriminated against. It may also be assumed that the frequencies of interest are denoted as $f_i$ through $f_m$, and that there are m frequencies of interest. Furthermore, each of the m frequencies of interest are harmonics of a base frequency which is designated as $f_b$. Recognizing that $f_i$ is equal to $n_i \times f_b$ where n is an integer and that in general, $f_i$ is equal to $n_i \times f_b$ where $i$ can be any value from 1 to m and the $n_i$'s are all positive integers. Further, the device will sample at a rate designated by $f_s$ where $f_s$ is equal to $k \times f_b$, where k is also a positive integer. Finally, sampling will start when time is equal to zero with the first sample being gathered at that point in time.

For the Omega system as an example, and as a first embodiment of this invention, $f_1$ is equal to 10.2 kHz, $f_2 = 11\frac{1}{3}$ kHz, $f_3 = 13.6$ kHz. $f_b$, the base frequency, is equal to $1133\frac{1}{3}$ Hz and $n_1 = 9$, $n_2 = 10$, $n_3 = 12$. The sampling is $15866\frac{2}{3}$ Hz and $k = 14$.

In this first embodiment of the invention, there are therefore 14 summing registers in the register bank 22, and preferably digital storing registers. Each of the digital registers is capable of holding the sum of many samples taken from the analog-to-digital converter 20. The first sample is stored in summing Register No. 1, the second, in Register 2, the 14th in Register No. 14. The 15th sample is added to Register No. 1, 16th to Register No. 2, the 28th to Register No. 14. The 29th is again added to Register No. 1 and the process continues cycling in this fashion with each sample being added to the appropriate register in sequence.

It may be observed that if the sampling rate is $f_s$, then the period between successive samples is $1/f_s$. Since $f_s = k \times f_b$, the period between successive samples is $1/(k \times f_b)$ and the amount of time that has elapsed after k samples have been taken is just $1/f_b$. The change in phase for the $i$th frequency over this period is equal to $n_i \times f_b$ divided by $f_b$ or $n_i$ an integer number of cycles. Therefore, the input to any summing register will have the same phase each time an addition is made to that register, constituting part of the fundamental principle upon which the present invention is based.

The implementation and control of the digital filter can be more fully understood with reference to FIG. 2, which is a flow diagram illustrating, in algorithmic form, the sequence of operations accomplished. However, anyone conversant with the state-of-the-art could interchange the order of certain operations without affecting the outcome and that the algorithms employed could be implemented with dedicated circuitry.

Block 101 represents a decision point as to whether or not it is time to measure the signal. Initiation of the measurement period will be controlled by other elements of the system, peripheral to this filter, such as whether Omega navigation is desired, whether synchronization is complete or underway, and whether the Omega stations are transmitting or not transmitting. Once the time-to-measure logic signal becomes true, the sequence proceeds to Block 102 where the action taken is setting an iteration counter m to a Zero state. Upon completion of this step, the sequence proceeds to Block 103 where the action is to set the contents of a word counter (j) to zero. The filter A is now in a state ready to process the first and subsequent samples.

The upcoming sample is selected (Block 104) and added to the contents of the word j of the accumulating registers, as indicated in Block 105. The word counter is incremented by one (Block 106) and a test is made whether the word count j has reached the limit k, where k equals 14, corresponding to the initial embodiment of this example. This test, Block 107, will fail for all j's less than 14 whereupon the sequence repeats steps in accordance with Blocks 104 through 107. When j equals 14, the test will pass and the sequence proceeds to Block 108 where the iteration counter M is incremental by one.

It is apparent that the process to this point has caused sequential samples to be placed in each of the accumulating registers and that one iteration through the registers is complete as indicated by the iteration counter M. Proceeding the Block 109, again a test is made as to whether the iteration count M has reached its limit L. For counts less than L, the test will fail and the sequence returns to Block 103, causing the next set of 14 samples to likewise be added to accumulating registers, i.e., sample 15 is added to word 1, sample 16 is added to word 2, etc. Upon completion of this iteration, the M counter is again incremented by one and the process continues until the count M reaches the preselected value L. In the initial embodiment of this invention, L is chosen as 800. When the count M reaches 800, the test shown in Block 109 will pass and the process sequence to Block 110. At this time the measurement cycle is essentially complete since M = 800 which corresponds approximately to the usable portion of the one-second Omega transmission time. The data gathered, namely words 1 through 14, are now available for other computational functions, particularly the computations of phase. The action taken in Block 110 then is the transfer of the data, reset of the word contents to zero and indicating the measurement cycle is complete, whereupon the sequence returns to the entry point to await the initiation of the next measurement cycle.

It should be observed in connection with the present invention, that the summing action just described is performed digitally and therefore can be perfect. All succeeding operations are also performed digitally and can be made as nearly perfect as desired, depending on implementation of the circuitry. One of the important accomplishments achieved by the present invention is to extend the dynamic range of a device operated by or in accordance with the filter of the invention and that the inherent limit to this dynamic range is the imperfection of the circuits and devices which traditionally have performed such action. Since there are only two such major sources of imperfections, it should become obvious that the reduction of inherent error can be achieved by proper circuit implementation which can lead to great enhancement in performance over the more traditional ways of performing such actions.

Spurious response frequencies are eliminating from the input frequency spectrum by above described circuitry and not created by errors in the analog circuits which perform the sampling, holding and analog-to-digital conversion functions. To the extent that such frequencies are created, errors in the output will occur. In general, when a mixture of frequencies is imposed upon a device which is nominally linear in operation, frequencies created by such non-linearities are harmonics of the input spectrum. If the input spectrum has been limited to one or more narrow bands of frequencies by preceding filters, then some control can be exercised over the potential harmonics and beats that can be generated, and these in turn can then be constrained to require sufficiently high enough harmonic distortion that reasonable circuit design can ensue. In the Omega application, it has been determined, for example, that non-linearities as high as a large fraction of a percent do not create sufficiently harmful spurious responses to degrade the output of the system below the desired 60 to 80 db dynamic range, and, in face, with fairly careful design, the dynamic range achievable and the ability to separate the multiple frequencies of interest has approached 80 db. That is, a signal on one frequency that is 80 db stronger than a signal on another frequency does not contribute an output on the channel associated with the weaker signal.

In the present invention, it may be desirable to first precede the sampling sensor by filters which eliminate those frequencies that would cause spurious responses. It may also be desirable to take precautions to prevent the generation of sufficiently great non-linear distortion in the sample and hold circuit and analog-to-digital converter to create those frequencies by mixing and multiplying the input spectrum of interest. One potentially severe source of such distortion would be saturation of the analog-to-digital converter and so assurance is required that the incoming signals be limited in amplitude so that they do not saturate the analog-to-digital converter. This limiting may be simply the face that it is known that the incoming signals will not reach such an amplitude.

It is also possible to provide narrow band clipping in an early stage in a receiver embodying this design with filtering following the clipping level operation. The use of narrow band clipping in the sense implies that the clipper operates on only one frequency of interest (and its immediate vicinity in the spectrum) at any point in time so that no two frequencies of interest are mixed together at one time in any one clipper. The resulting noise spectrum surrounding the frequency of interest can be constrained to prevent generation of any of the frequencies that would cause a spurious response by a limit on the bandwidth of the clipper. Furthermore, a filter following the clipper can remove any harmonics generated by the clipping action and again act to constrain the output of that clipping channel to the immediate spectral vicinity of that frequency of interest. When these outputs are then analog summed, the only frequencies to be presented to the sampler are those which do not cause spurious responses and of amplitudes which are assured to be below the saturation level of the analog-to-digital converter.

By its very nature, digital operation implies a limit on resolution governed by the value assigned to the least significant digit. However, a peculiar result derives from the fact that many samples are summed together in the function of the sampler. While the signals of interest, all because of the frequency relationship involved, have the same instantaneous value at each instant of sampling, any noise in the input to the sampler has no such repetitive pattern. The effect is to "dither" the input to the analog-to-digital converter. If the instantaneous signal value is close to a value that would cause a higher digital output, the sum of noise plus signal will sometimes exceed this value and the digital result will be the larger digital value. At other times, the noise will instantaneously subtract from the signal value, and the lower value will result. Since many such samples are summed together, the effect is that of averaging the noise which implicitly gives greater resolution than would be obtained were only single samples made at each sampling point. This effect of enhancing the resolution of the fast sampler over that which would appear to be its limit due to the limited resolution of the analog-to-digital converter is quite distinct from the long term filtering action that comes from summing and averaging over a significant period of time.

In connection with the preceding description of the invention, the particular embodiment of the invention that has been illustrated and described has been a means for measuring the phases of the three primary frequencies transmitted as part of the Omega navigation system. There is certainly no limitation to be inferred that the invention can be applied in only this way. For example, within the Omega system itself, it is possible that a fourth frequency of 10.88 kHz will be transmitted. If it is desired to apply the sampling digital filter in its present form to the inclusion of the fourth frequency, only relatively minor changes would be required in the implementation thereof.

The base frequency, instead of being 1133⅓ kHz, would become 170th of that frequency, or 226⅔ Hz. The sampling rate would be 14 × 5 the new base frequency, or $k$ in other words would be 70, which would mean that the actual sampling rate would remain the same, 15866⅔ Hz, so no change to the actual physical sampling counter would take place. Moreover, no change would be required in the filter, except that a fourth filter "F", limiter "L", and post filter "G" would be required. The register block 22 would then contain 70 registers instead of 14, and the counter 18 would count from 1 through 70 rather than from 1 through 14. The processing action would be the same in form, but would contain 70 terms in the sum instead of 14.

In the digital processing function in the sampling type digital filter, different weights may be applied to different samples. The digital type filter may also be used as a sampling receiver in which the register block 22 is partitioned into subgroups or sub-sets in which a given sample may be added to more than one register at any point in time. In this way, if one bank of registers which is large enough to hold all the various frequencies to be sampled would be larger than a partitioned subset, then the sub-set may be used. For example, it would be possible to measure certain combinations of frequencies by grouping two or three samples to be extracted from one set of registers and have another set of registers providing the combination of the values of $k$ and $n$ that would permit extraction of these other frequencies. Thus, the total number of registers required in this way would be smaller than the number required to gather all of the frequencies of interest in one bank of registers.

When the digital type filter is used as a receiver, such device also includes signal reception means having provision for calibrating phase shifts and gain through the receiver by introduction of a calibrate signal into the receiver or into the antenna itself. In particular, this calibrate signal may adopt the form of a pulse when the pulse repetition frequency is the common subharmonic associated with the system.

Additional functions may be appended to the receiver to perform other tasks or to enhance the performance of the filter. Thus, other forms of non-linear circuits might be included that are not directly related to the reception of the frequencies of interest, or which exist to enhance this reception. More sophisticated digital processing may be used to produce information as to the position of the receiver itself. Thus, propagation delays in the signals, or other information which would incorporate doppler tones, frequency offset of signals which are near in frequency to the nominal frequency of interest or other such means may be used to produce information as to positional relationship of the receiver.

Furthermore, the period of summation can be broken into short segments and the specific operations carried on with respect to the segments could be combined in certain ways to provide information about frequencies which were near to, but not exactly these frequencies classed on the frequencies of interest, that is, exact harmonics of the previously defined common subharmonic. For example, when an Omega receiver is installed in an aircraft it frequently senses radiated harmonics of the aircraft power system which has a nominal frequency of 400 Hz, but whose actual frequency can vary in somewhat unpredictable ways but by small amounts from 400 Hz. Harmonics of this base frequency often appear in the band of frequencies commonly known as the Omega band and which are the frequencies of interest for the sampling sensor. It is possible that by segmenting the normal bust period of the Omega signal into short segments of a fraction of a second, that information pertaining to these harmonics can be gathered, and that by appropriate digital processing, these harmonics can be eliminated from the final result or at least reduced in their impact by means other than simple averaging.

Referring now in more detail and by reference characters to FIG. 3 of the drawings which illustrates another preferred embodiment of the present invention, A designates a receiver used in Omega type radio navigation systems.

The receiver A generally includes a coupler-preamplifier 50 which may be connected to a conventional antenna 52 for receiving one or more transmitted signals containing the three frequencies of interest. In this particular case, the standard pre-established frequencies of interest normally used in the Omega type radio navigation systems are, as described above, 10.2 kHz, 11.3 kHz, and 13.6 kHz.

The coupler-preamplifier 50 is connected through a combining node 54 to a plurality of bandpass amplifiers designated as 56a, 56b, and 56c, forming part of a sampling digital filter B, the latter being illustrated in dotted lines in FIG. 4. These bandpass amplifiers 56a–56c essentially serve as bandpass filters to permit passage of the particular frequency of interest to thereby remove any extraneous signals or noise. Thus, the bandpass filter 56a will pass only those frequencies of 10.2 kHz, the filter 56b will pass only those frequencies of 11.3 kHz, and the bandpass filter 56c will pass only those frequencies of 13.6 kHz. It should be observed that an additional bandpass filter 56d (illustrated in phantom lines) may be added in the event that a fourth frequency is included within the transmitted signal. In this respect, it should also be observed that the amplifier A, and consequently the sampling digital filter used herein, is capable of being operated with any number of frequencies in the transmitted signal.

Generally, the bandpass amplifiers 56a–56d comprise a bandpass filter which is followed by a clipping amplifier, and a lowpass filter in series therewith. This latter low-pass filter is primarily designed to remove harmonics which would normally be generated during the clipping process. The clipping amplifier is designed to alleviate the effects of spike noise to some extent. The bandpass filters would normally attenuate signals a thousand Hz from the center frequency by 60 db.

The outputs of each of the amplifiers 56a–56d are introduced into a summing node 58. The summing node 58 also receives an output from an analog multiplexer 60 which, in turn, receives various input signals from the mobile station, such as the aircraft. These input signals generally include, for example, airspeed, altitude, heading signals and the like. Furthermore, it should be observed that any superimposed dc voltage could be introduced into the mutliplexer 60 for filtering activity in the same manner as any of the other input signals.

The combined signal output of the summing node 58 is introduced into a sample and hold circuit 62, the latter of which is more fully schematically illustrated in FIG. 4 of the drawings. The sample and hold circuit 62 in its general construction includes an amplifier 63 which has an input from the summer 58. The output of the amplifier 63 is introduced into a field effect transistor 64 which also receives a clock or countdown input from a counter to be hereinafter described. The output of the field effect transistor 64 is grounded through a capacitor 65 and also connected as an input to an amplifier 66 in the manner as illustrated in FIG. 4 of the drawings. The amplifier 63 also receives a feedback input from the output of the amplifer 66, and the output of the amplifier 66 is also introduced into an analog-to-digital converter 68. In addition, the analog-to-digital converter 68 receives a countdown input from a counter 70.

The field effect transistor 64 effectively serves as a switch. Thus, when the transistor 64 is biased to conduction, the analog-to-digital converter input will follow a combined analog signal. The transistor 64 is opened by a countdown pulse from the counter 70, and is closed again by a data ready signal introduced into the sample and hold circuit 62 over the data ready line 67. The counter 70 preferably includes a set of bistable elements such as flip-flops.

The counter 70 is designed to initiate a sample frequency at a preselected sample rate. This sampling rate is greater than the highest frequency of interest which is being measured. As indicated previously, the highest frequency of interest is 13.6 kHz. Consequently, in one preferred embodiment of the present invention, the sampling frequency which is utilized is 14 times the subharmonic frequency, or at about 15,866⅔ Hz.

The output of the analog-to-digital converter 68 is introduced into a data processor 72 which is essentially a fast sampler processor, and is illustrated and described in more detail hereinafter. However, by further reference to FIG. 3, it can be observed that the data processor 72 provides a multiplexer 60. In addition, the data processor 72 provides a calibrate control signal output 76 which is introduced into a calibrate logic circuit 78. The calibrate logic circuit receives a set input 80 from the counter 70 and a reset input 82 from the counter 70, and generates calibrate pulses which are introduced into the combining node 54 over a line 84. The calibrate logic or calibrate circuit 78 is essentially conventional in its construction and is, therefore, neither illustrated nor described in any further detail herein. This calibrate circuit 78 is primarily used when the filter B is included in an Omega type receiver capacity. Finally, a phase extractor 90 is connected to the output of the processor 72.

Thus, there has been illustrated and described a novel coherent sampling digital filter and its employment in an Omega type radio navigation system, and which therefore fulfils all of the objects and advantages sought therefor. Many changes, modifications, variations and other uses and applications of the digital filter and the radio navigation system will become apparent to those skilled in the art after considering this specification and the accompanying drawings. All such changes, modifications, variations and other uses and applications which do not depart from the spirit and scope of the invention are deemed to be covered by the invention which is limited only by the claims which follow.

Having thus described our invention, what we desire to claim and secure by Letters Patent is:

1. A coherent sampling digital type filter for processing a composite signal having a plurality of frequencies of interest and all of which frequencies of interest have a common subharmonic frequency, said filter comprising:
    a. input means for receiving the external composite signal,
    b. sampling means operatively connected to the input for receiving the composite signal and sampling portions thereof at a rate which is an additional harmonic of the common subharmonic, and for measuring the instantaneous time value of the composite signal,
    c. conversion means operatively associated with the sampling means and receiving the sampled portions of the composite signal for generating a digital equivalent thereof at a preselected sample rate,
    d. sample timing means operatively connected to said sampling means and said conversion means for enabling the generation of the frequencies of interest at the preselected sampling rate, and
    e. a digital type data processor operatively connected to said conversion means to construct a set of sums of the samples and performing certain arithmetic operations thereon to determine the phase and amplitudes of the frequencies of interest contained within the composite signal.

2. The sampling digital type filter of claim 1 wherein the sampling means comprises a sample and hold circuit and the conversion means comprises an analog-to-digital converter to convert the sampled portions of the composite signal to a digital equivalent at the preselected sample rate.

3. The sampling digital type filter claim 1 further characterized in that the input means comprises:
    a. at least one bandpass filter to eliminate frequencies which would cause a spurious response, and
    b. means operatively connected to said bandpass filter for combining each of the frequencies of interest to form a composite signal.

4. The sampling digital type filter of claim 1 wherein the composite signal includes three frequencies of interest wich are approximately 10.2 kHz, 11⅓ kHz, and 13.6 kHz, respectively.

5. The sampling digital type filter of claim 1 further characterized in that the signal includes four frequencies of interest, which are 10.2 kHz, 10.88 kHz, 11⅓ kHz, and 13.6 kHz, respectively.

6. The sampling digital type filter of claim 1 further characterized in that the digital type data processor includes a plurality of registers into which each of the samples values are summed.

7. The sampling digital type filter of claim 6 wherein the number of registers is equal to the number of samples into which the common subharmonic frequency is divided.

8. An omega type navigation receiver comprising:
   a. antenna means for receiving a transmitted composite signal comprised of a plurality of pre-established frequencies of interest which have a common subharmonic frequency,
   b. input means operatively connected to said antenna means to receive the transmitted composite signal,
   c. sampling and conversion means operatively connected to said input means for receiving the composite signal for sampling portions thereof and generating a digital equivalent thereof at a preselected sample rate,
   d. sample timing means operatively connected to the sampling and conversion means for enabling the generation of samples of the frequencies of interest at a preselected sample rate,
   e. and a digital type processor operatively connected to said sampling and conversion means to construct a set of sums of the samples to determine the phase relationship of the frequencies of interest contained within the composite signal.

9. The omega type navigation receiver of claim 8 further characterized in that the sampling and conversion means comprises a sample and hold circuit which samples a group of sampled frequencies at a rate which is an additional harmonic of the common subharmonic and measures the instantaneous time value of the composite signal, and an analog-to-digital converter to convert the sampled frequencies to a digital equivalent at a preselected sample rate.

10. The omega type navigation receiver of claim 9 further characterized in that a counter is operatively connected to said analog-to-digital converter for permitting said sampling at said preselected sample rate.

11. The omega type navigation receiver of claim 8 further characterized in that the input means comprises:
   a. bandpass filter means operatively connected to said antennae means for receiving the transmitted signal and eliminating frequencies which cause spurious responses,
   b. and summating means operatively connected to the bandpass filter means to combine the passed frequencies of interest.

12. The omega type navigation receiver of claim 11 further characterized in that a coupler-preamplifier is operatively interposed between said antenna means and said bandpass filter means.

13. The omega type navigation receiver of claim 10 further characterized in that a crystal oscillator is operatively connected to said counter and solid data processor to provide compensation for temperature variation.

* * * * *